3,554,953
PROCESS FOR THE PRODUCTION OF
POLYVINYL HALIDE
Eugene Alfred Duchesneau, Jr., and Donald Francis Boudreau, Leominster, Mass., assignors to Borden, Inc., New York, N.Y., a corporation of New Jersey
No Drawing. Filed Dec. 14, 1966, Ser. No. 601,556
Int. Cl. C08f 3/30, 15/36, 45/24
U.S. Cl. 260—29.6
6 Claims

ABSTRACT OF THE DISCLOSURE

This invention relates to a process of making fine particle size polymerized vinyl chloride and copolymers of vinyl chloride with other copolymerizable monomers by aqueous suspension in the presence of a suspending agent which is the reaction product of a $C_2$–$C_4$ alkylene oxide and a partially neutralized copolymer of an acrylate ester and an acrylic acid.

---

Fine polymers, as on the order of microns and smaller, have been made by various methods, including addition of up to about 4% of a suspending agent in the polymerization mixture and using a high shear device like a homogenizer, polymerizing under high speed agitation, grinding polymerized particles to a smaller size, and like methods. These methods do not provide consistent results, thereby limiting their value.

The present invention provides a process for making fine particle size polymerized vinyl chloride and copolymers of vinyl chloride with other copolymerizable monomers which result in an average resin particle size finer than about 70 microns with as much as 50% finer than 44 microns.

Briefly stated, the present invention comprises the polymerization process hereinafter described and the suspending agent used in said process.

The suspending agent is the chemical reaction product of a $C_1$–$C_4$ alkylene oxide and a partially neutralized copolymer of an acrylate ester and an acrylic acid which has been neutralized with a critical proportion of alkali. The suspending agent is preferably an emulsion of said reaction product.

As to the component materials of the suspending agent, the acrylic type acid may be acrylic or methacrylic acid, and the copolymerizable ester therewith is any $C_1$–$C_4$ alkyl ester of either of these acids. Examples of the class of alkyl esters which may be used are the methyl, ethyl, any propyl, and any butyl acrylate or methacrylate.

Examples of the $C_1$–$C_4$ alkylene oxide include ethylene, propylene, and butylene oxide. Polyhydroxy alcohols such as propylene glycol are less desirable, even though they do cause reduction of the particle size of the vinyl polymers. Their desirability is limited for the reason that the resins hereafter described made with such alcohol suspending agents are found to be contaminated with residual alcohol and results in a purification problem. The suspending agent is prepared by copolymerization of the acrylic type acid and ester followed by the acid catalyzed reaction between the copolymer and the alkylene oxide. The suspending agent as made is used in the suspension polymerization of vinyl chloride and copolymers thereof by first partially neutralizing the agent with an alkali such as sodium hydroxide. The partial neutralization of the agent is critical to the process for making the fine particle size vinyl polymers. It is believed that there is a critical balance between the hydrophilic and lipophilic properties of the suspending agent and that within the critical range of the present invention provides optimum results in terms of particle size. This range has been found to be neutralization of between about 10% and 40% of the theoretical carboxylic groups of the acid-ester interpolymer. Within this range, 20%–25% neutralization is preferred with 22.1% having been found to provide optimum results.

Specifically, the suspending agent is prepared by emulsion polymerizing of the acrylic type monomers in the presence of an initiator of ethylenic bond polymerization which is any conventional inorganic initiator. Polymerization initiators include, for example, persulfate compounds such as sodium or other alkali metals and ammonium persulfate, and inorganic peroxides. Particularly satisfactory results are obtained when the initiator is used in combination with reducing agents, e.g., alkali metal bisulfite such as sodium or potassium metabisulfite admixed before or during the polymerization.

Emulsifiers that are particularly effective in this polymerization in addition to others known in this art are chosen from the following group: alkali metal salts of alkyl aryl polyether sulfates wherein the alkyl and aryl groups are suitable dodecyl and phenyl respectively; alkyl phenyl polyethylene glycol ether wherein the alkyl group is suitably octyl or dodecyl; dioctyl ester of sodium sulfosuccinic acid; and the like.

The copolymerization is effected in an aqueous system under preferably an inert and oxygen-free atmosphere in the moderate temperature range of between about 10°–90° C. The acrylic monomers and additives are charged to the reaction vessel, and the reducing agent (such as metal bisulphite) may be added continuously over the period of polymerization. Agitation is maintained in the system and after polymerization has been accomplished, the emulsion may be diluted.

The unneutralized copolymer is then combined with the alkylene oxide under acidic conditions as by slowly adding the particular alkylene oxide to an acidified copolymer aqueous emulsion of the type described. Agitation is maintained and the temperature is maintained in a moderate range as for example, 80°–160° F. The resulting emulsion following partial neutralization can be used directly as a suspending agent for vinyl chloride polymerization.

As to proportions, the acrylic and/or methacrylic acid is used in the amount of 25–95 parts for 100 total weight parts of the acid and ester monomers. The initiator of ethenoid polymerization is used in the amount of about .05–2 parts, the inorganic reducing agent in proportion of about .01–2 parts and preferably not more than .5 parts, the surfactant in the proportion of about .5–15 parts, and water in proportion of about 400–2000 parts, all for 100 total parts by weight of the acrylic type monomers to be copolymerized in the emulsion system. The proportion of alkylene oxide is in the range of 75–125 parts by weight of the oxide for 100 parts of acid and ester monomers of the interpolymer. The range found most effective is between about 90–110 parts of the alkylene oxide, with the optimum being about 100 parts.

In use as a suspending agent for vinyl chloride polymerization, we have found that the required particle size is obtained when proportion of the active suspending agent is used in the preferred range of between about .2–3% by weight of vinyl chloride and other monomers, with the optimum proportion being about 1%.

In use as a suspending agent, we have found that the agent must be neutralized, preferably with alkali such as sodium hydroxide added as a 10–15% solution. The neutralization is partial to the extent that only 10–40% of the theoretical amount of carboxylic groups in the copolymer is neutralized with 22.1% providing optimum results.

In a typical vinyl chloride suspension polymerization, the suspending agent is admixed in an aqueous solution of neutralizing alkali, such as 10% sodium hydroxide. The vinyl chloride polymerization catalyst is added together with other known additives such as stabilizers, antioxidant, defoamers, and the like, followed by addition of the vinyl chloride monomer and when required, other monomers copolymerizable therewith. The system is maintained under agitation and heated to moderate temperatures as for example, 90°–160° F. Polymerization is considered complete when the pressure in the polymerization vessel drops substantially, as in several examples, to about 50 p.s.i.g. from an initial pressure of about 90–160 p.s.i.g.

Other monomers which may be copolymerized with vinyl chloride include vinyl acetate, vinylidene chloride, acrylic and methacrylic acid and other non-active alkyl and halogen substituted acrylic type acids such as chloroacrylic acid, and $C_1$–$C_8$ alkyl esters of said acids and like comonomers. As to the proportion of comonomers, we have found that the particle size remains small and in the desired range of 5–30 microns when the proportion of vinyl chloride is at least 80 parts by weight and desirably at least 95 parts by weight for 100 parts total of the copolymerizable monomers.

The invention will be further illustrated by the description in connection with the following specific examples. Here and elsewhere herein the proportions are expressed as parts by weight unless specifically stated to the contrary.

EXAMPLE I

Into a 2-liter resin flask equipped with a paddle-type agitator, an addition funnel and a nitrogen addition tube were charged a mixture of 112.2 parts consisting of 46.3% glacial methacrylic acid and 53.7% methyl methacrylate. The remainder of the reactor charge was 514.8 parts of water, 2.01 parts of Aerosol OT (sodium dioctyl ester of sulfosuccinic acid) 75% aqueous, 6.8 parts of Triton X-301 (alkaryl polyether sulfate), 7.15 parts of Tergitol NP-14 (sodium alkyl sulfate), 0.112 part of ammonium persulfate, and 0.05 part of hydroquinone. A nitrogen flow was started to sweep out oxygen and the vessel was warmed to 40° C. Additional components or proportions consisting of 120 parts of water and 0.0112 part of potassium metabisulfite were added over a one-half hour period. The reaction temperature was maintained at 40°–42° C. by cooling when necessary. On completion of the addition, the reactor was stirred for an additional half hour. To an aqueous emulsion of the copolymer was added 110 parts of water and .1 part 10% sulfuric acid solution. Into the agitated mixture was slowly added propylene oxide in proportion of about 75 parts. This is in the weight ratio of 1:1 alkylene oxide to acrylic-type copolymer. Addition of the oxide was maintained at the rate of between about .9–1.4 parts per minute. The temperature was maintained at about 136° F. for three hours, after which cooling to about 80–85° F. was permitted. The resulting emulsion as hereinafter described was used as the suspending agent for vinyl chloride polymerization after adjustment to a solid content in the range of approximately 5–15%.

EXAMPLE II

The procedure of Example I is repeated except that the methacrylic acid and methyl methacrylate is replaced separately and in turn by the other acrylic type acids and esters herein described and in the proportions disclosed

EXAMPLE III

The procedure of Example I is repeated except that the propylene oxide is replaced separately and in turn by the other $C_1$–$C_4$ alkylene oxides herein described and in the proportions disclosed.

EXAMPLE IV

The suspending agent as made in Example I was added to a water solution of sodium hydroxide in the proportions shown.

TABLE I

| Materials: | Proportions parts by wt. |
|---|---|
| Water | 230 |
| Suspending agent (10.40% solids) | 5.3 |
| Sodium hydroxide (10%) | .5 |
| Sodium acetate (anhydrous) | .5 |

The pH of the solution was about 7. In similar examples the pH was varied between 6–8 with good results.

The aqueous system was evacuated and charged with a nitrogen blanket. As catalyst, .17 parts of a 15% solution of diisopropyl peroxydicarbonate in V.M. and P. naphtha was charged. Vinyl chloride monomer in proportion of 100 parts was charged (normally between 120°–140° F.) to the vessel. Pressure 140 p.s.i.g. The vessel was rapidly heated to polymerization temperature as rapidly as possible. Pressure, heat and agitation were maintained for 3–8 hours. When the pressure dropped to about 50 p.s.i.g., this signified substantially complete polymerization.

EXAMPLE V

The procedure of Example IV is repeated, except that the suspending agents used are the suspending agents of Examples II and III.

EXAMPLE VI

In a modification of the procedure of this invention, the procedure of Example 1 was repeated, except that no propyleneoxide or any other alkylene oxide was used in conjunction therewith. This product was used as a suspending agent in the procedure as described in Example IV.

EXAMPLE VII

In the table that follows there is compared the particle size of the products of examples of this invention with agents prepared without alkylene oxide.

TABLE II

| Sample | Mesh (and micron) analysis | | | | |
|---|---|---|---|---|---|
| | No. 80 (177) | No. 140 (105) | No. 270 (53) | No. 325 (44) | Through 325 |
| Example IV (propylene oxide) | .6 | .4 | 3.6 | 17.8 | 79.0 |
| Example V (ethylene oxide) | 0 | 0 | 45.0 | 5.2 | 48.6 |
| Example VI* | 0 | .7 | 33.7 | 33.6 | 29.5 |

*For comparison only.

EXAMPLE VIII

The procedure of Example IV is repeated, except that the vinyl chloride monomer is replaced with the comonomers described in proportion of up to 20 parts of said comonomer for 100 parts of total monomers. In one example, at .5 part of methyl acrylate comonomer with 99.5 parts of vinyl chloride, the screen analysis was (in terms of percent retained on mesh screen), 80—.5%; 140—.5%; 270—1.0%; 325—15.0%; through 325—83.0%.

EXAMPLE IX

In procedures where the suspending agent described was neutralized in proportion outside of the 10%–40% range described, it was found that the particle size distribution of suspension polymer made as in Example IV was substantially coarser than 70 microns. As the optimum neutralization proportion of 22.1% was approached, it was found that the particle size distribution of the polymer approached at least 50% finer than 44 microns.

EXAMPLE X

The resin of Example IV was used in the following standard formulation to coat a fabric used in upholstering:

| Material: | Proportions parts by wt. |
|---|---|
| Dispersion grade resin | 70 |
| Resin of Ex. IV | 30 |
| Dioctyl phthalate | 35 |
| Calcium carbonate | 10 |
| Barium-cadmium-zinc stabilizer (Advastab S-63) | 3 |
| Epoxidized soybean oil (Paraplex G-62) | 5 |
| Viscosity depressant (Vistrol A-100) | 1 |

The composition formed by admixing the materials was deaerated and a 10 mil. wet film coated onto a cloth backing using a knife coater. The coated compound was cured on the cloth by a heat treatment of 350° F. for 4 minutes. The use of the fine suspension resin of Example IV gave the compound plastisol a lower viscosity compared to one utilizing all dispersion grade resin.

It will be understood that it is intended to cover all changes and modifications of the examples of the invention herein chosen for the purpose of illustration which do not constitute departures from the spirit and scope of the invention.

What is claimed is:

1. The process of making an aqueous suspension of vinyl polymer having average particle size distribution finer than about 70 microns comprising the steps of polymerizing vinyl monomers containing at least 80 parts by weight of vinyl chloride for 100 parts total monomers in the presence of additives comprising:
   (1) an initiator of polymerization for said monomers; and
   (2) a suspending agent having between 10–40% of the theoretical carboxylic groups neutralized in said agent, and comprising as said agent, the reaction product of about 75–125 parts of a $C_1$–$C_4$ alkylene oxide with 100 parts of an interpolymer of an acrylic-type acid selected from the group consisting of acrylic acid, methacrylic acid, and mixtures thereof with lower alkyl esters of said acids; said acrylic type acid being present in the amount of 25–95 parts by weight for 100 parts of said interpolymer.

2. The process of claim 1 wherein said particle size distribution is at least 50% finer than 44 microns; said partial neutralization of said agent is between 20–25%; and said agent is the reaction product of:
   (a) between 90–110 parts by weight propylene oxide with;
   (b) 100 parts by weight of an interpolymer of acrylic acid and methyl methacrylate, said interpolymer comprising 25–95 parts by weight of said acid for 100 parts of said interpolymer.

3. The process of claim 1 wherein said vinyl polymer is a copolymer of vinyl chloride and a lower alkyl acrylate.

4. The process of claim 3 wherein said acrylate is methyl acrylate in the proportion of .5–5 parts by weight for 100 parts total monomers.

5. A suspending agent for vinyl monomer polymerization, said agent having 10–40% of the theoretical carboxylic groups neutralized, and comprising as said agent, the reaction product of about 75–125 parts of a $C_1$–$C_4$ alkylene oxide with 100 parts of an interpolymer formed in an aqueous system of an acrylic-type acid selected from the group consisting of acrylic acid, methacrylic acid, and mixtures thereof with lower alkyl esters of said acids; said acrylic type acid comprising 25–95 parts by weight for 100 parts of said interpolymer, and the reaction between said alkylene oxide and said interpolymer being acid-catalyzed.

6. The agent of claim 5, wherein said partial neutralization of said agent is between 20–25%; and said agent is the reaction product of:
   (a) between 90–110 parts by weight propylene oxide with;
   (b) 100 parts by weight of an interpolymer of acrylic acid and methyl methacrylate, said interpolymer comprising 25–95 parts by weight of said acid for 100 parts of said interpolymer.

References Cited

UNITED STATES PATENTS

| | | | |
|---|---|---|---|
| 2,862,912 | 12/1958 | Ott | 260—29.6RWX |
| 3,037,952 | 6/1962 | Jordan et al. | 260—29.6RW |
| 3,387,061 | 6/1968 | Smith et al. | 260—874 |
| 3,056,764 | 10/1962 | Graham et al. | 260—86.1X |
| 3,002,959 | 10/1961 | Hicks | 260—86.1X |

MURRAY TILLMAN, Primary Examiner

H. ROBERTS, Primary Examiner

U.S. Cl. X.R.

117—161; 252—351; 260—80.75, 86.1, 86.3, 87.1, 87.5, 92.8, 884, 899